UNITED STATES PATENT OFFICE.

JOHN SEALY EDWARD TOWNSEND, OF OXFORD, ENGLAND.

VARIOMETER.

1,421,041. Specification of Letters Patent. Patented June 27, 1922.

Application filed August 22, 1921. Serial No. 494,263.

(GRANTED UNDER THE PROVISIONS OF THE ACT OF MARCH 3, 1921, 41 STAT. L., 1313.)

*To all whom it may concern:*

Be it known that I, JOHN SEALY EDWARD TOWNSEND, a subject of the King of Great Britain, residing at 20 Merton Street, Oxford, England, have invented a new and useful Improvement in Variometers (for which I have filed applications in Great Britain on May 18, 1917; France on March 2, 1918, and Italy on December 31, 1918), of which the following is a specification.

In my Patent No. 1376592 I have described a variometer on which two ranges of inductance in the proportion of 4 to 1 could be measured with one set of graduations, the one range being measured with two coils (the one fixed and the other rotatable) connected in series and the other with the two coils connected in parallel. In such a variometer it is essential that the inductance of the fixed coil shall be equal to that of the rotatable coil.

According to this invention I provide a variometer by which the same result can be obtained without the necessity of making the fixed inductance equal to the movable inductance. I construct a variometer of two fixed coils and two movable coils, one of the fixed coils being connected to one of the movable coils and the other fixed coil being connected to the other movable coil. Two pairs of connected coils are thus formed, and the required result is obtained by adjusting the coils so that the self induction of one pair is equal to that of the other pair for each position of the movable coils.

Figure 1:
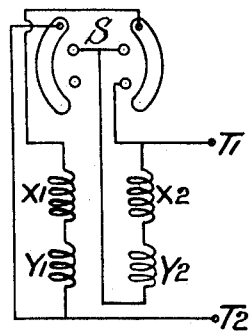
Figure 2:
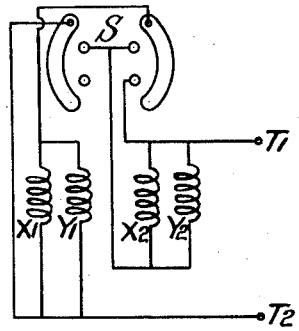

The invention is illustrated by the accompanying drawing, of which Figure 1 is a diagram showing each fixed coil connected in series with a movable coil and Figure 2 is a diagram showing each fixed coil connected in parallel with a movable coil. These two figures are similar to Figure 7 of my Patent No. 1376592.

Figure 3:
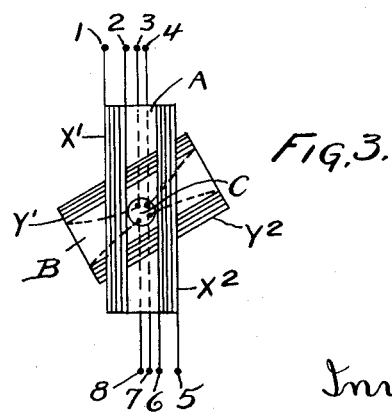

Figure 3 shows how the four coils may be mounted. $X^1$ and $X^2$ are two fixed coils wound on a fixed frame A and having their ends connected to wires 1, 2, and 5, 6, respectively. $Y^1$ and $Y^2$ are two coils wound on a frame B which can be rotated about pivots C in the frame A. These two coils have their ends connected by flexible leads to wires 3, 4, and 7, 8, respectively. By joining wire 2 to wire 3 and wire 6 to wire 7, the four coils will be arranged as shown in Figure 1, that is, with $X^1$ in series with $Y^1$ and $X^2$ in series with $Y^2$, while by joining together wire 1 to wire 3, wire 2 to wire 4, wire 5 to wire 7 and wire 6 to wire 8, the four coils will be connected as shown in Figure 2, that is, with $X^1$ in parallel with $Y^1$ and $X^2$ in parallel with $Y^2$.

The coils are adjusted so that for each position of the moving coils the self induction of the pair $X^1$, $Y^1$, is equal to that of the pair $X^2$, $Y^2$.

This result may be obtained by making the coils $X^1$ and $X^2$ of the same size and same self induction and having them similarly situated with respect to the axis of rotation of the coils $Y^1$ and $Y^2$ and by making the coils $Y^1$ and $Y^2$ of the same size and same self induction and having them similarly situated with respect to the axis of rotation.

The two pairs of coils are connected to a series parallel switch S by means of which the pair $X^1$ $Y^1$ can be connected either in series or in parallel with the pair $X^2$ $Y^2$, the total inductance of the two pairs in the first case for any position of the coils $Y^1$ $Y^2$ being four times the total inductance of the two pairs in the second case for the same position.

$T^1$ and $T^2$ are the terminals of the variometer.

What I claim is:—

1. In a variometer, the combination of two fixed coils, two movable coils, one of the fixed coils being connected to one of the movable coils to form one pair of coils, the other fixed coil being connected to the other movable coil to form another pair of coils, the self induction of the one pair being equal to that of the other pair, and a switch adapted to connect the two pairs in series or in parallel.

2. In a variometer, the combination of two fixed coils of equal self induction, two movable coils of equal self induction, one of the fixed coils being connected to one of the movable coils to form one pair of coils, the other fixed coil being connected to the other movable coil to form another pair of coils, and a switch adapted to connect the two pairs in series or in parallel.

3. In a variometer, the combination of two fixed coils of equal self induction, two other coils also of equal self induction and rotatable relatively to the first two coils, one of the fixed coils being connected to one of the rotatable coils to form one pair of coils, the other fixed coil being connected to the other rotatable coil to form another pair of coils, and a switch adapted to connect the two pairs in series or in parallel.

4. In a variometer, the combination of two fixed coils, two other coils rotatable relatively to the first two coils, one of the fixed coils being connected to one of the rotatable coils to form one pair of coils, the other fixed coil being connected to the other rotatable coil to form another pair of coils, the self induction of the one pair being equal to that of the other pair, and a switch adapted to connect the two pairs in series or in parallel.

5. In a variometer, the combination of two fixed coils of equal self induction, two other coils also of equal self induction and rotatable relatively to the first two coils, the two fixed coils being arranged in similar positions with respect to the axis of rotation and the two rotatable coils being also arranged in similar positions with respect to the axis of rotation, one of the fixed coils being connected to one of the rotatable coils to form one pair of coils, the other fixed coil being connected to the other rotatable coil to form another pair of coils and a switch adapted to connect the two pairs in series or in parallel.

6. In a variometer, the combination of two fixed coils, two other coils rotatable within the first two coils, one of the fixed coils being connected to one of the rotatable coils to form one pair of coils, the other fixed coil being connected to the other rotatable coil to form another pair of coils, the self induction of the one pair being equal to that of the other pair, and a switch adapted to connect the two pairs in series or in parallel.

7. In a variometer, the combination of two fixed coils of equal self induction, two other coils also of equal self induction and rotatable within the first two coils, the two fixed coils being arranged in similar positions with respect to the axis of rotation and the two rotatable coils being also arranged in similar positions with respect to the axis of rotation, one of the fixed coils being connected to one of the rotatable coils to form one pair of coils, the other fixed coil being connected to the other rotatable coil to form another pair of coils, and a switch adapted to connect the two pairs in series or in parallel.

In testimony that I claim the foregoing as my invention I have signed my name this 9th day of August, 1921.

JOHN SEALY EDWARD TOWNSEND.